Oct. 26, 1971  J. H. LEMELSON  3,615,034
FRANGIBLE CONTAINER
Filed Dec. 12, 1968

INVENTOR.
Jerome H. Lemelson

United States Patent Office 3,615,034
Patented Oct. 26, 1971

1

3,615,034
FRANGIBLE CONTAINER
Jerome H. Lemelson, 85 Rector St.,
Metuchen, N.J. 08840
Continuation-in-part of application Ser. No. 609,397,
Jan. 16, 1967. This application Dec. 12, 1968,
Ser. No. 783,320
Int. Cl. B65d 17/00
U.S. Cl. 220—27                                  3 Claims

ABSTRACT OF THE DISCLOSURE

An apparatus for molding hollow containers which may be easily opened and the article itself are provided. The apparatus produces a thin-walled hollow container having a narrow strip-like portion of its wall reduced in thickness to such a degree that the container may be easily opened. In one form, the container is severed by twisting. In another form, the wall is shaped with a strip-like portion which is severable by pulling on same. A cutting means may also be applied to effect opening. Auxiliary supporting means may also be provided to normally prevent severance of the weakened portion of the container.

RELATED APPLICATIONS

This is a continuation-in-part of application Ser. No. 609,397 filed Jan. 16, 1967 now Pat. No. 3,426,959 issued Feb. 11, 1969, for Packaging Assembly and having as a parent application Ser. No. 362,568 filed Apr. 27, 1964, now Patent No. 3,311,288 issued Mar. 28, 1967.

SUMMARY OF THE INVENTION

This invention relates to molded packages or containers for fluent material and an apparatus for producing same.

It is known to form product containers such as bottles and the like by blow molding a hollow tube or molding known as a parison, between the cavity walls of a plurality of mold members and fluidically deforming or expanding said parison outwardly to conform the shape of the molding cavity. Such containers require a separate closure as they are difficult to open by severing the walls thereof.

While most blow molded containers, which are provided with a threaded closure, may be hermetically sealed by proper design of the closure, such containers have generally not been applicable to hold contents under pressure. Furthermore, where the contents are generally dispensed during one operation after opening, the cost of providing a suitable closure is relatively high.

The constructions defined herein and illustrated in the accompanying drawings provide for one or two-piece blow molded containers which are totally sealed without the need for a threaded closure and may be easily opened by cutting or tearing a portion of the wall of the container or a simple sheet-like material which has been integrally welded to the container wall. Accordingly, it is a primary object of the instant invention to provide a new and improved container construction and an apparatus and method for producing same.

Another object is to provide a molded container which may be formed by blow molding a unitary parison and means defined by the molding step for simply and rapidly opening the container by severing a portion of its wall.

Another object is to provide an improved construction in a container formed by molding having easily removable means for supporting a portion of the wall of the container with said container wall being such that it may be easily opened once the supporting means is removed.

Another object is to provide a container assembly having an easily removable seal and retainer for two or more container parts which may be easily separated once the seal is removed.

Another object is to provide improved constructions in container wall structures having necked down portions which may be easily severed to open the container, methods and apparatus for producing same.

Another object is to provide a new and improved method for sealing container portions together in a manner to secure and hermetically seal the container yet permit the opening thereof without difficulty.

With the above and such other objects in view as may hereafter more fully appear, the invention consists of the novel constructions, combinations and arrangements of parts as will be more fully described and illustrated in the accompanying drawings, but it is to be understood that changes, variation and modifications may be resorted to which fall within the scope of the invention as claimed.

Figures 7, 8, 9, 10, 11:
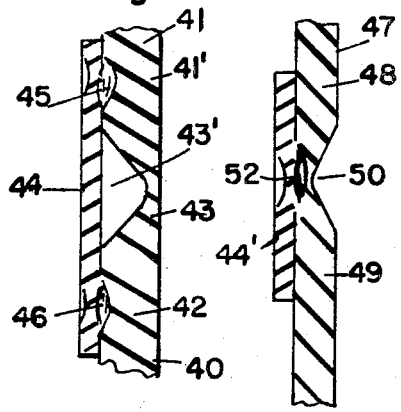
FIG. 7 is a cross-sectional view of a portion of the side wall of a molded container having a reduction in wall thickness of the type provided in FIG. 6 and further having a circumscribing reinforcing strip-like element which is removable therefrom to permit opening of the container along the reduced cross-section portion.
FIG. 8 is a cross-sectional view of a portion of a container wall of the type shown in FIG. 5 and having a reinforcing removable element.
FIG. 9 is a cross-sectional view of a portion of a wall of a container having a wire element attached thereto which, when removed therefrom, is operative to sever the container wall.

FIG. 10 is a cross-sectional view of a portion of a container wall containing a wire integrally provided within the wall during the molding process and FIG. 11 is a cross-sectional view of a container wall having a wire element secured in a recess formed in the wall for reinforcing the portions of the wall on both sides thereof and operative, when removed therefrom, to permit easy opening of said container.

SUMMARY OF THE INVENTION

Figure 1:
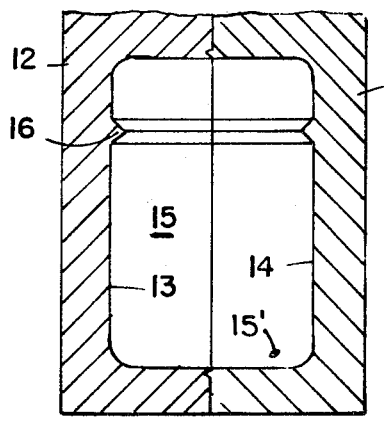
FIG. 1 is a cross-sectional view of part of a molding apparatus including a mold utilized for blow molding a hollow contained in accordance with the teachings of the instant invention.

There is shown in FIG. 1 a portion of a mold assembly 10 comprising mold halves 11 and 12 shaped with inside walls 13 and 14 defining a molding cavity 15 into which a parison or the like is disposed by suitable known means (not shown) to be blown against said walls 13 and 14 and molded to conform to the shape thereof. In FIG. 1, the cavity is shaped to define a hollow object such as a plastic bottle or container having a substantially cylindrical side wall.

Formed in the walls of the mold halves 11 and 12 and protruding outwardly therefrom so as to project inwardly into the cavity 15 is a V-shaped, ridge-like formation 16 having tapering side walls 17 and 18 terminating at a relatively sharp apex line 19. The formation 16 preferably circumscribes the side wall of the mold cavity and is composed of formations 16a and 16b in the respective molds which align with each other to form substantially a single or continuous ridge around the inside of the mold wall.

Figure 2:
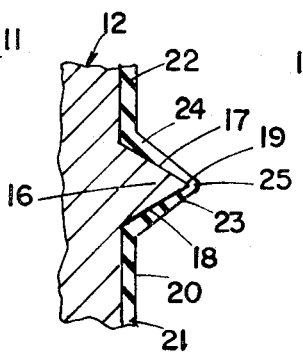
FIG. 2 is a fragmentary view in cross-section of a portion of the mold shown in FIG. 1.

When a plastic parison is blow molded to shape in the mold 10 and forced by internal fluid pressure to conform to the wall of the mold cavity, it is deformed against the V-shaped formation 16 which serves not only to provide a narrow channel circumscribing the wall of the molding but also to substantially reduce the thickness of the walls at the bottom of the channel as clearly shown in FIG. 2. The molding 20 is shown having cylindrical wall portions 21 and 22 on both sides of the channel or groove formed against the ridge formation 16 of the mold. Side walls 23 and 24 of the channel are shown tapering in thickness and meet at a minimal thickness region 25 at the base of the channel or groove resulting from flow of the material over the edge 19 and drawing thereof down the side walls of the ridge 16. The thickness of the wall at the apex line 25 is preferably such that it may be easily severed by a simple cutting implement such as a knife or razor blade or, in the extreme, may be sheared by twisting or pulling the portions of the portions 21 and 22 of the molding when it is desired to open the container. The degree of reduction in thickness of the parison wall when molded by means of apparatus of the type illustrated in FIGS. 1 and 2 will depend on a number of factors including the height and degree of taper of the ridge-like formation 16, the flow characteristics of the parison wall and the degree it is already blown when it contacts the wall of the mold.

Figure 3:
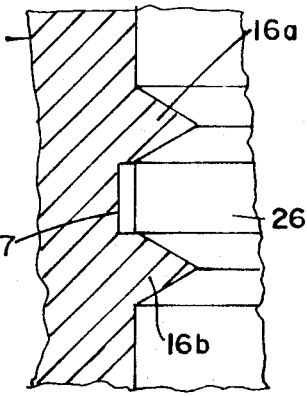
FIG. 3 is a fragmentary view in cross section of a modified portion of a mold employed to produce a container in accordance with the instant invention.

In FIG. 3 is shown a modified form of mold wall of the type shown in FIGS. 1 and 2 wherein the single ridge-like wall formation is replaced with two such formations extending parallel to each other around the mold wall and denoted 16a' and 16b', there being a space 26 of flat cross sectional shape provided between the formations 16a' and 16b' to define a portion of the container wall which may be removed as by cutting or pulling from the container in order to sever the two portions of the container from each other along the two reduced thickness lines defined by the apex lines of the formations 16a' and 16b'. A suitably shaped sub-cavity 27 in wall portion 26 may serve to form a portion of the container wall which protrudes outwardly from the main wall and/or the portion formed against wall portion 26 to permit finger gripping and pull-tearing the strip formed between the grooves formed against ridges 16a' and 16b'. The wall portion of the container formed in sub-cavity 27 may be further worked in the mold or after the container is removed from the mold such as by thermally deforming, pinching, punching, drilling, or otherwise forming same to facilitate starting the action of tearing the container wall along the groove lines thereof defined by apex lines 16a and 16b of the mold wall.

Figures 4, 5, 6:
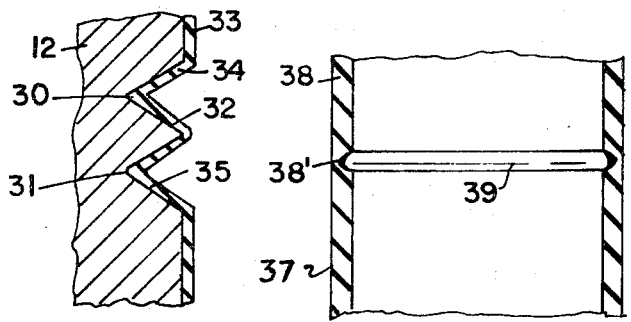
FIG. 4 is a fragmentary view in cross section of another form of mold structure utilized to produce a container in accordance with the instant invention.
FIG. 5 is a fragmentary view in side cross-section of a modified form of container or parison utilized to produce a container, the side wall of said container or parison containing a reduction in its thickness from the inside.
FIG. 6 is a modified form of container or parison having a side wall with a reduction in thickness extending from the outside thereof.

In FIG. 4 is shown another modification in the shape of the mold wall to effect a line-like reduction of thickness which is sufficient to permit the separation or pull tearing of the wall of the molding as described. The walls of the mold are provided with a pair of spaced apart, parallel circumscribing V-shaped cavities 30 and 31 defining therebetween a V-shaped ridge or band 32. Thus, the wall of the molding 33 is provided with a pair of protruding formations 34 and 35 which have tapered side walls and define a channel having a narrow band-like or line base 37 of minimum wall thickness operative to be severed as described above by either a cutting implement or by means of a shearing or pulling action applied to the container wall.

FIG. 5 shows a portion of the wall 38 of a container 37 formed by extrusion or blow molding of an extruded parison. A groove 39 is provided preferably circumscribing the inside surface of the wall to provide a narrow band-like portion 38' which is of substantially less thickness than the remainder of the wall as illustrated. The reduction in wall thickness is effected by the automatic or program controlled movement of an irregularly shaped mandrel in the extrusion die opening to reduce the annular spacing between the mandrel and the die for a short enough period of time to effect wall thickness reduction of the extrusion or parison such that when the article is blown to shape in the mold, the reduced wall thickness portion 38' will be formed and may be utilized per se to simplify opening of the container as described above or by the means provided hereafter. In other words, the thickness of the wall portion 38' may be such as to normally retain the container in one piece but permit it to be severed along the line or band of minimum thickness by twisting, pulling or cutting action.

In FIG. 6 is shown another modified form of extrusion or blow molding 37' having its side wall 38'' provided with a groove 39' circumscribing same so as to leave a narrow portion 38a of the wall of sufficiently reduced thickness to permit a tear opening to be effected in said wall or severance of the portions of the container on both sides of said reduced thickness portion by pulling, twisting or other action. The circumscribing groove or channel 39' may be formed in the blow molded container by parison control or programming or by means of a cutting tool operative to spin cut said groove therein by rotating about the container by or spinning the container with respect to the tool as in a lathe to permit the tool to cut said groove a sufficient depth to permit severance of the container portions on both sides thereof as described.

In FIG. 7 a portion of a wall 41 of a container 40 formed by blow molding as described or other form of molding is provided with a reduced thickness portion 43 which normally may be easily severed by applying a twisting or bending force between the upper portion 41 and the lower portion of the container. The reduced thickness portion 43 either circumscribes the side wall of the container such as a bottle or canister or circumscribes an area of the wall inwardly of which it is desired to remove or provide a flap-like opening to the container. If the section 43 is sufficiently reduced in thickness to permit separation of the upper and lower portions 41 and 42 of the container from each other without difficulty, such action may normally occur during handling of the container and, accordingly, in FIG. 7, a strip 44 of suitable plastic film or other material extends across the groove or channel 43' defining the reduced wall thickness section of the wall 40 and is welded or bonded along its upper and lower borders by circumscribing weld lines 45 and 46. The strip or band section 44 thus remains in place during normal packaging and handling operations and may be removed by a pulling operation tearing said strip along separated parallel score lines (not shown) or along the welded or bond lines 45 and 46. Once the strip 44 is removed, the upper and lower portions 41 and 42 of the container may be separated from each other by a bending, twisting or pulling action or by applying a cutting blade to the reduced thickness portion 43 of the container. It is noted that a container wall structure of the type shown in FIG. 3 may be reinforced with a tearable strip similar to 44 by bonding or welding said strips for example, to the outer surfaces of the upper and lower portions 21 and 22 of the container. In many instances, the inside surface of the strip 44 may be coated with a pressure-sensitive adhesive permitting it to be easily applied and removed from the container wall.

Yet another structure in a tear strip means applicable to a blow molded container is shown in FIG. 8. The container 47 has a side wall composed of upper and lower portions 48 and 49 desired to be severed from each other or to have an opening formed therein by a simple pulling action. The wall portions 48 and 49 are separated by a wall portion 50 of reduced wall thickness. Disposed in alignment with and preferably overlapping or extending along the border of the reduced thickness portion 50 is a strip 51 of flexible material such as a plastic having a higher tensile strength than the material of which the container is made. The strip or band 51 is welded or sealed to the reduced wall thickness portion 50 along the length thereof by a weld line 52 having the characteristics such that when the strip 51 is pulled away from the wall of the container, it will effect either a severance along the reduced thickness portion 50 or will sufficiently reduce the thickness of wall portion 50 such that a simple twisting, pulling or bending action effected by hand to the wall of the container will be operative to sever the upper and lower portions 48 and 49 from each other or will permit finger pushing in a tab-like portion of the container wall defined inwardly of the reduced section 50 and the weld line 52 extending therealong.

In FIG. 9 is shown a container having a wall 53 composed of upper and lower portions 54 and 55 and a reduced thickness portion 56 against and within which a wire or tear strip 57 is partially embedded. Pulling the wire 57 to the left by grasping an end thereof extending through the container wall, may be operative to completely sever and the upper and lower portions 54 and 55 from each other. Pulling wire 57 to the right by grasping an end portion thereof, may be operative to sufficiently weaken the wall along portion 56 by removing the support provided by the wire or strip 57 to permit the container to be severed along said weakened portion by a pulling, twisting or bending action.

In FIG. 10, a container formed by extrusion or blow molding has a wire or tear strip completely encapsulated within its side wall which, when a force is applied to pull said wire or tear strip outwardly from the wall, the result is the weakening of said wall such that it may be easily opened thereafter as described. The wire or tear strip 57 which may be round or rectangular in cross section may have an end extending outwardly from the wall of the container to permit it to be easily grasped and pulled to remove it from the wall of the container for the purposes described.

In FIG. 11 is shown a modified form of the container molded by means of the apparatus shown in FIG. 2. A wire or tear strip 57 is shown secured within the groove defined by the tapered side wall portions 23 and 24 and is preferably either heat sealed therein or adhesively bonded thereto. When the strip or wire 57 is pulled outwardly from the wall of the container it may either serve to sever the container wall or to sufficiently reduce its strength upon removal such that a simple pulling, twisting or bending action may be operative to sever the upper and lower portions 22 and 21 of the container wall from each other or to provide a tab-like door to the container interior.

I claim:

1. A container having thin sheet-like walls made of a synthetic plastic resin and having a circumscribing wall portion, a score-line extending peripherally in said circumscribing wall portion of said container and reducing said container wall portion in thickness a degree such that the container may be opened to expose the contents thereof by the manual application of shearing forces to said container at said score-line, and reinforcing means overlying the peripherally extending score-line, said reinforcing means comprising a flexible strip secured to the container wall on both sides of said score-line and normally preventing the severance of said container along said score-line.

2. A molded container in accordance with claim 1, said strip being adhesively bonded to said container wall and being peelable therefrom.

3. A molded container in accordance with claim 2, said strip being heat sealed to said container walls on both sides of said line.

References Cited

UNITED STATES PATENTS

| 2,630,238 | 3/1953 | Battersby | 150—.5 UX |
| 2,941,660 | 6/1960 | Tupper | 150—.5 UX |
| 3,396,899 | 8/1968 | Strouse et al. | 220—53 |
| 3,447,711 | 6/1969 | Bozek | 220—53 |
| 1,125,834 | 1/1915 | German | 215—32 |
| 3,216,562 | 11/1965 | Lockwood | 206—56 |

FOREIGN PATENTS

| 1,300,068 | 6/1962 | France | 215—1.5 |

GEORGE T. HALL, Primary Examiner

U.S. Cl. X.R.

220—53